Figure 4:
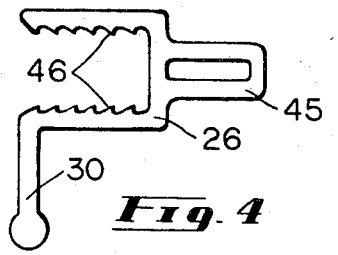

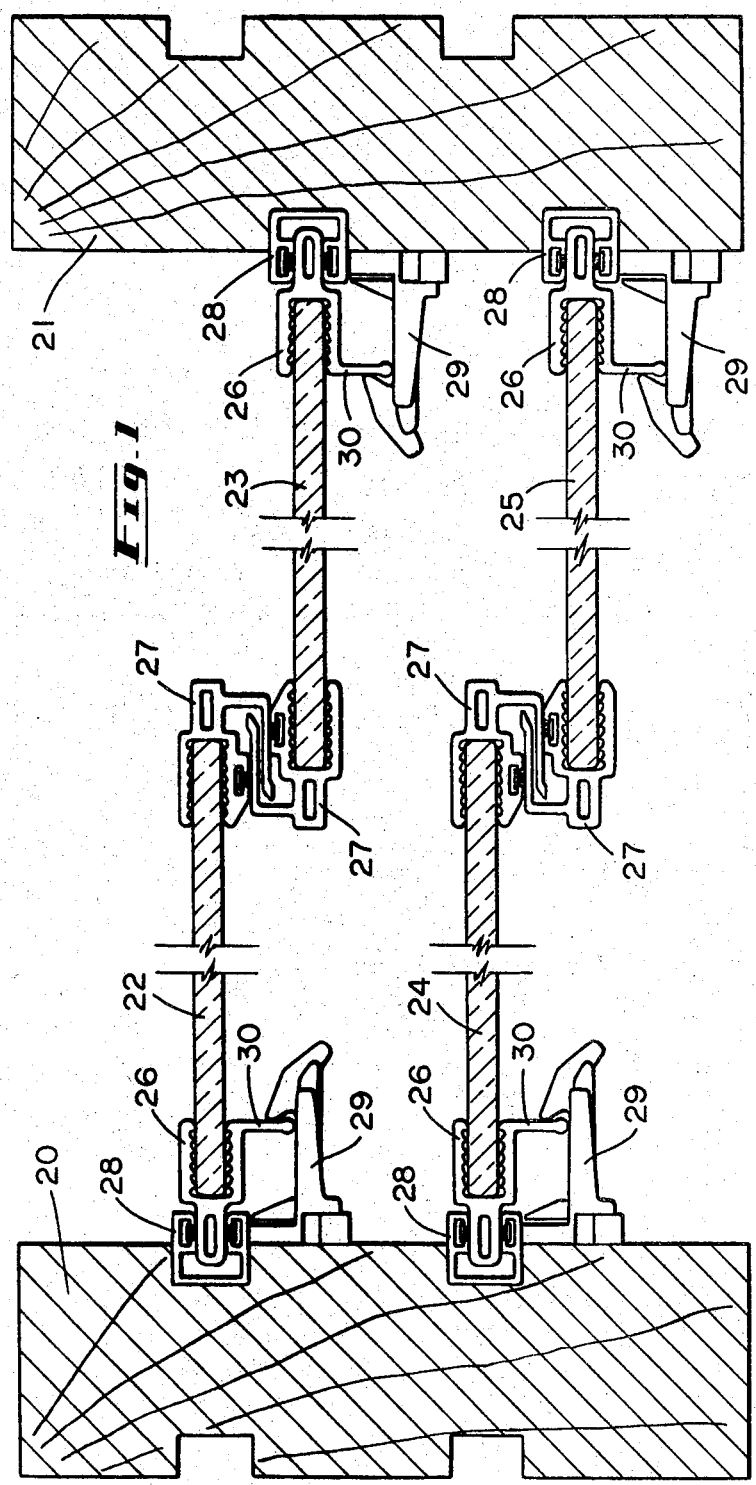

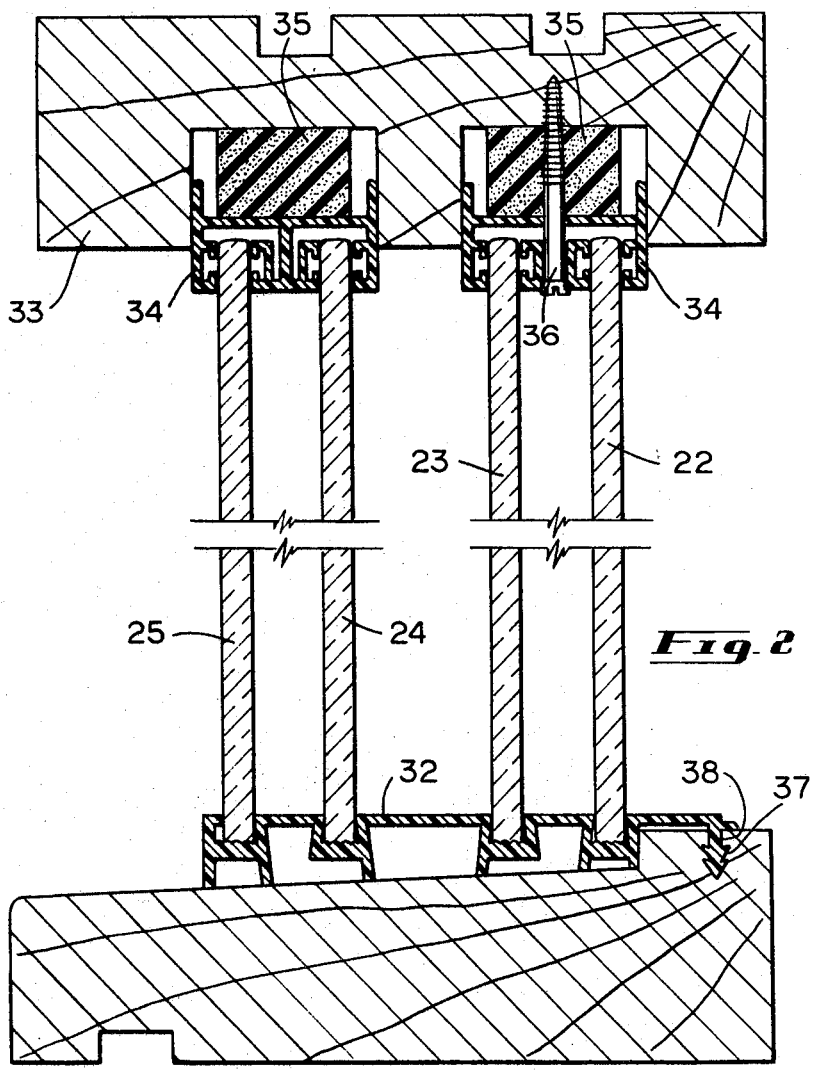
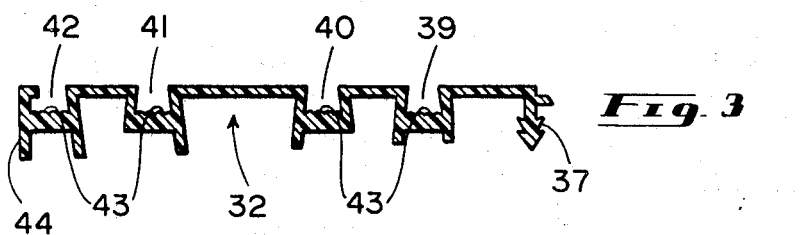

May 21, 1968 R. DALLAIRE 3,383,801
WINDOW
Filed Feb. 15, 1965 7 Sheets-Sheet 4
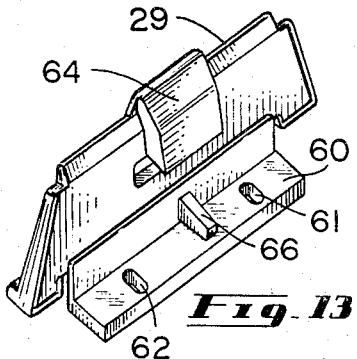
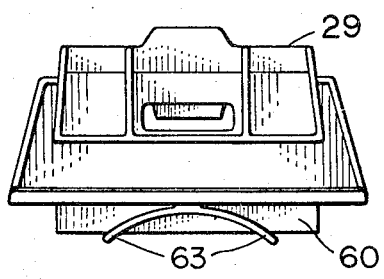
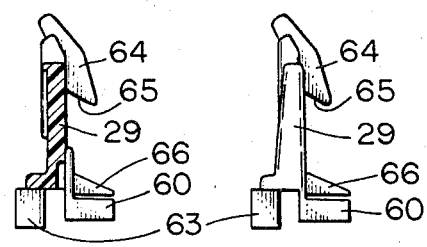
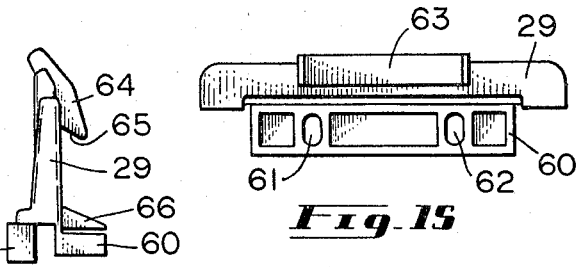
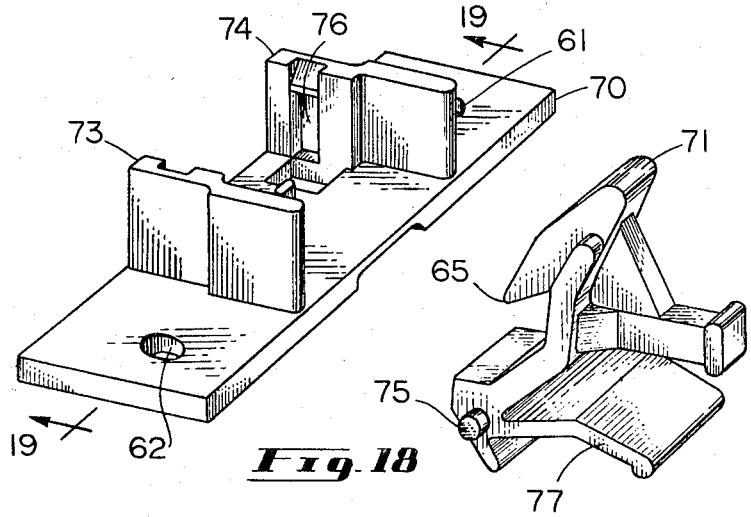
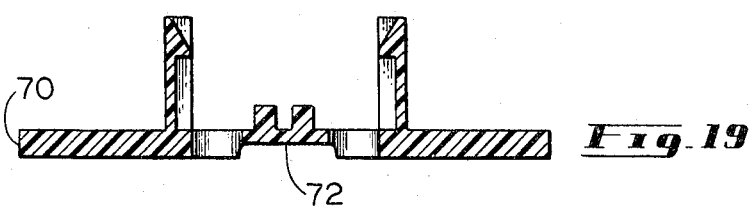

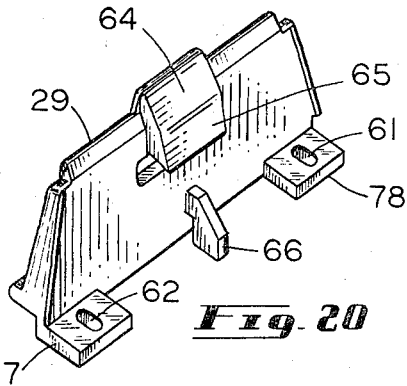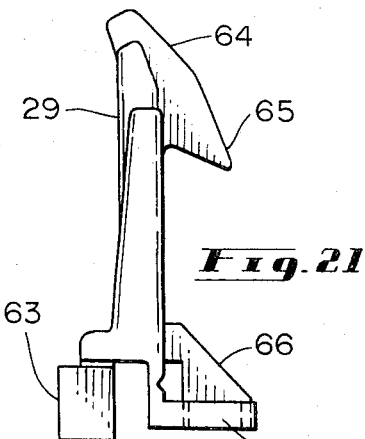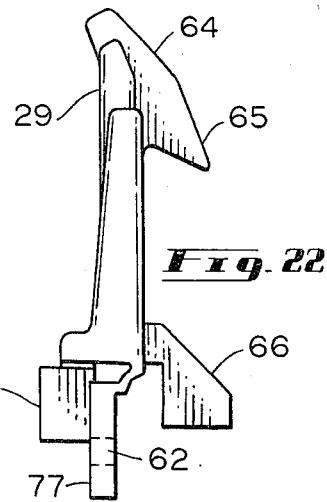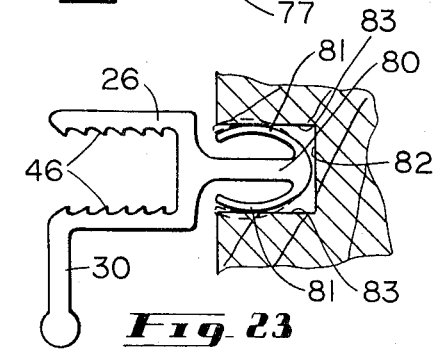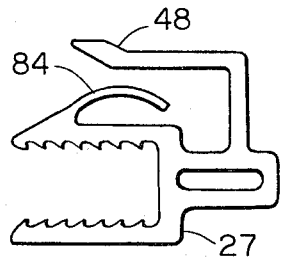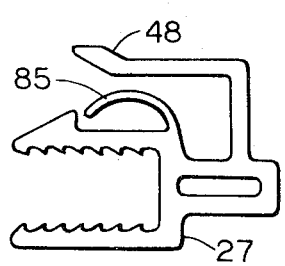

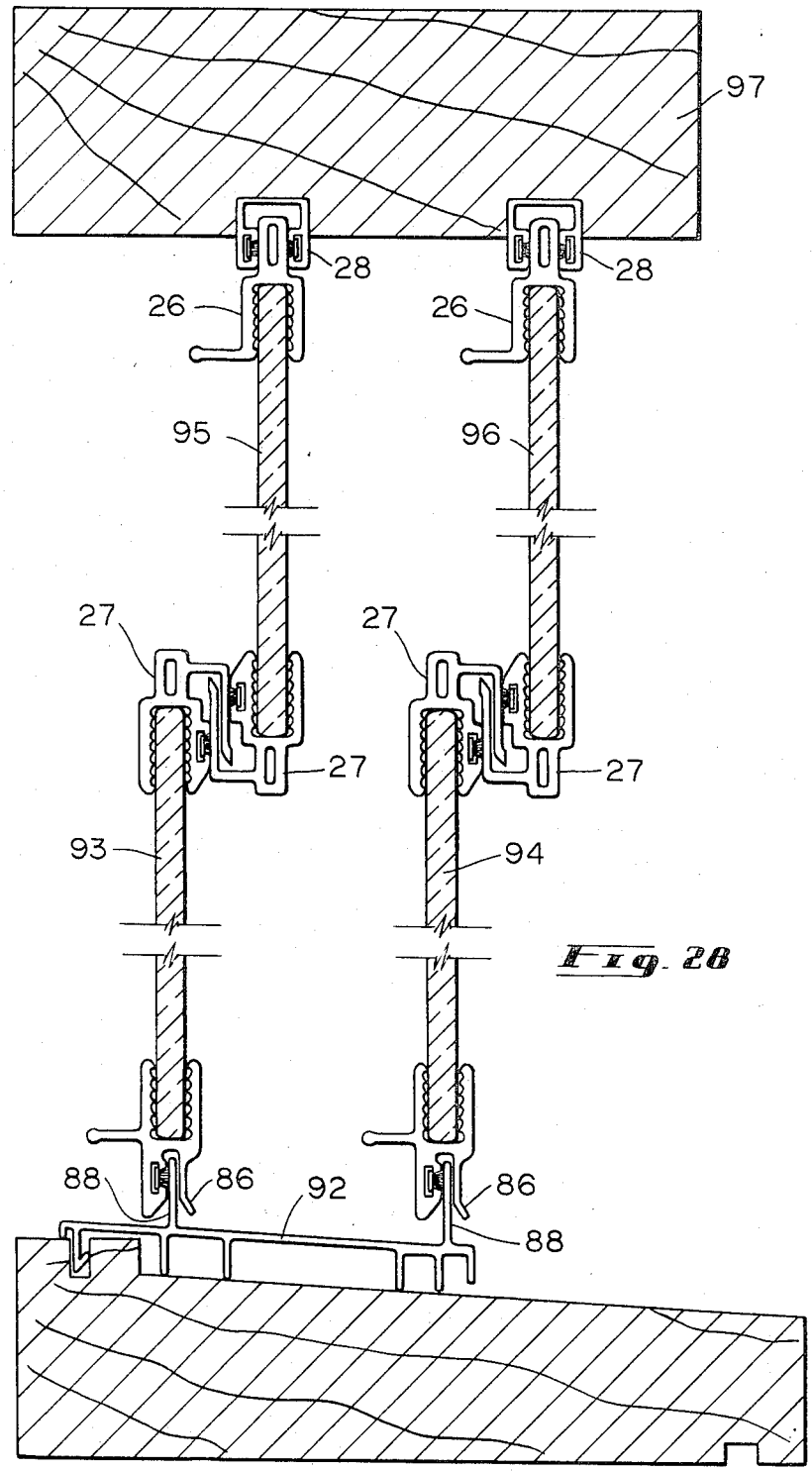

United States Patent Office 3,383,801
Patented May 21, 1968

3,383,801
WINDOW
Raymond Dallaire, St. David, Quebec, Canada, assignor to P. H. Plastics Inc., Lauzon, Quebec, Canada, a corporation of Canada
Filed Feb. 15, 1965, Ser. No. 432,587
Claims priority, application Great Britain, Feb. 18, 1964, 6,788/64
6 Claims. (Cl. 49—458)

The present invention relates to a slider type window of the so-called "sashless" type in which a pair of panes of glass are mounted in parallel tracks and at least one of the panes is adapted for sliding movement in one of the tracks so that the window may be opened and closed.

Sashless windows have been used to a great extent in modern houses. These windows have become increasingly popular because of their convenience and relative cheapness and because they lend themselves to mass production. The present invention provides a sashless window of an improved type having advantages over all known types of sashless windows and providing an improved unit which may readily be prefabricated on a mass production basis for installation in project houses. The window structure in accordance with the invention represents a major improvement in weather tightness over the windows previously in use. The window of the present invention also is easy to remove for cleaning purposes without sacrificing its weather-tight qualities and further is provided with a simple and reliable locking mechanism which positively locks the sliding panes against unauthorized opening from the outside of the window.

The present invention also relates to a plurality of extruded mouldings which may be assembled together with suitable frames and window glass to provide a sashless window having the above advantages. These extrusions are preferably made from plastic materials such as vinyl and are provided with several features which ensure a weather-tight seal when the panes of the sashless window are closed.

One feature of the present invention is the provision of a sill track of extruded plastic material such as vinyl, which is adapted to cooperate with a wooden sill to provide the bearing surface for the sliding panes of a sashless window and offers an improved seal between the wooden sill and the sill track.

A defect of prior sill tracks has been that with variations in temperatures the sill track would not lie uniformly against the sill but would assume a serpentine shape which permitted drafts and water to pass beneath the sill track and into the interior of the building in which the window was installed. The sill track of the present invention includes an improved means whereby the inner edge is retained in position on the sill to maintain an even uniform seal of the sill track to the sill. Other features of the sill track of the invention include the provision of drainage holes beneath the slot in which each pane of glass slides to permit any wind driven rain or condensation which runs down the face of a pane to drain through the sill track and away from the window opening.

The present invention also provides an improved form of header track for a sashless window together with a novel construction and combination of parts for assembling a header track to the header of a sashless window.

A further feature of the invention is a meeting rail which is fitted to the edge of each sliding pane remote from the jamb when the window is closed, which meeting rail cooperates with the meeting rail of the corresponding pane to provide a weather tight seal between the vertical edges of the two panes when the window is shut.

The present invention provides a side rail which is affixed to the vertical edge of each sliding pane and which is provided with a projecting flange which is engaged by a locking member affixed to the jamb to lock the window in the closed position. The locking member which is affixed to the jamb is moulded from one piece of plastic material such as nylon and provides a simple and extremely efficient means for locking the panes against opening from the outside of the window.

A further feature of the invention is an extruded side track which may be fitted to the jamb of the window unit and into which the aforementioned side rail fits to form a weatherproof seal at the point where the sliding pane engages the jamb.

The present invention also provides an improved two piece lock member which may be used alternatively to the single piece lock member which has equal strength and which may be more readily moulded, thereby reducing production costs.

In accordance with other features of the invention, alternative means are provided for providing a seal between the head, the sill and the jambs, and in a further form of the invention a double hung window may be formed making use of the extrusions of the present invention.

These and other features and objects of the invention will be more fully revealed in the following detailed disclosures.

Figure 5:
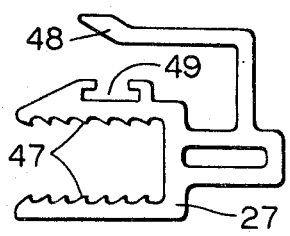
Figures 7, 8:
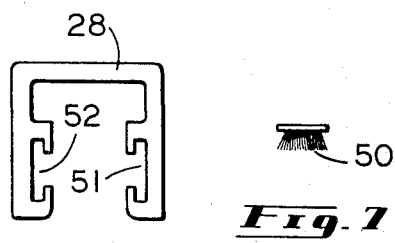
Figure 6:
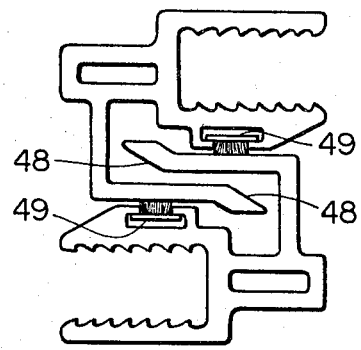
Figure 26:
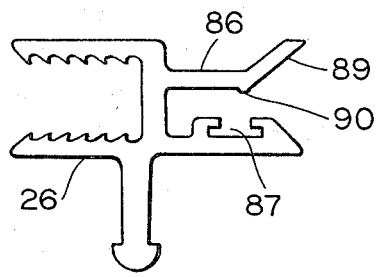
Figure 27:
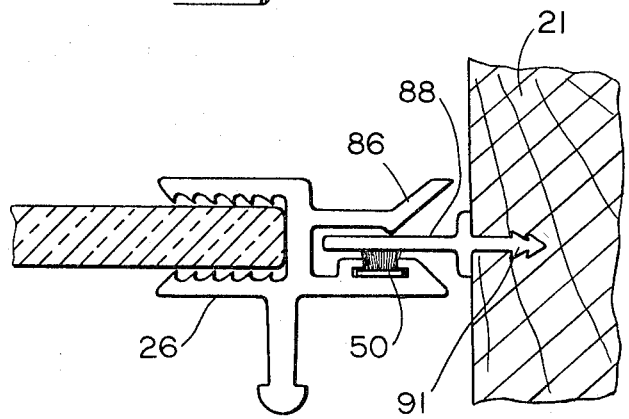

In drawings which illustrate embodiments of the invention,

FIGURE 1 is a horizontal section through a double sashless window constructed in accordance with the invention, FIGURE 2 is a vertical section through the window of FIGURE 1, FIGURE 3 is a cross-section of a sill track extrusion, FIGURE 4 is a cross-section of a side rail extrusion, FIGURE 5 is a cross-section of a meeting rail extrusion, FIGURE 6 illustrates a pair of meeting rails in closed position, FIGURE 7 is a section of a weather strip for use with the present invention, FIGURE 8 is a cross-section of a side track extrusion, FIGURES 9, 10, 11 and 12 are sections of various forms of header track extrusions in accordance with the invention, FIGURE 13 is a perspective view of a locking member of the invention, FIGURES 14, 15, 16 and 17 are views illustrating the locking member of FIGURE 13, FIGURE 18 is an exploded perspective of an alternative form of locking member in accordance with the invention, FIGURE 19 is a cross section on the line 19—19 of FIGURE 18, FIGURE 20 is a perspective view of a further form of a locking member in accordance with the invention, FIGURES 21 and 22 are side elevations of the locking member of FIGURE 20, FIGURE 21 being the member as installed and 22 being the member as moulded, FIGURE 23 is an alternative form of a side rail extrusion for use where no side track is used, FIGURE 24 is an alternative form of meeting rail, FIGURE 25 is a further alternative and less preferred form of meeting rail in accordance with the present invention, FIGURE 26 is a cross-section of a further form of side rail extrusion, FIGURE 27 is a cross-section through a window using the side rail extrusion of FIGURE 26, and FIGURE 28 is a vertical section through a double hung window following the teachings of the present invention.

FIGURE 1 is a horizontal section through a double sashless windo constructed in acordance with the teachings of the invention and as shown this window consists of a jamb 20 and a jamb 21 between which two pairs of sliding windows 22, 23, 24 and 25 are positioned. Each sliding pane 22, 23, 24 and 25 is provided with a side rail 26 and a meeting rail 27. Each jamb 20 and 21 is equipped with a pair of side tracks 28 and a pair of locking members 29.

The panes 22 and 23 are positioned to the outside of the windows and the panes 24 and 25 on the inner portion of the window. Each of the panes 22, 23, 24 and 25 may be moved horizontally by unlocking the associated locking member 29 which engages the flange 30 of the side rail 26 when the window is in its closed and locked position.

FIGURE 2 is a view which is a composite vertical section through the window of FIGURE 1. In actual fact a straight section through any point of FIGURE 1 would show only two panes such as panes 22 and 24 in section at one time, whereas in the section of FIGURE 2 all four panes of the double window may be seen. In this view the sill 31 on which a sill track 32 is mounted may be seen. A header 33 is positioned at the top of the window. The sill 31, the header 33 and the two jambs 20 and 21 of FIGURE 1 thus form a rectangular window frame in which the window unit is positioned. It will be noted that the header 33 is provided with header tracks 34 which are positioned above the sill track 32 and provide vertically aligned tracks in which the panes 22, 23, 24 and 25 may slide. Positioned above each header track 34 is a resilient foamed plastic or other suitable member 35 which effectively forms a draft stop above header 34 to prevent the infiltration of outside air past the windows. The header track 34 may be fixed to the header 33 by means of suitable fasteners such as for example the screw 36. It will be noted that the header track 34 may be moved upwardly by compressing the foam member 35 to permit the panes of glass to be removed from the slots in the sill track 32 for cleaning the window or assembly and disassembly purposes. When the header track is slid upwardly the screw 36 does not prevent motion of the header track 34 but rather serves only to prevent downward motion of the track 34 beyond a preselected position and to keep the resilient member 35 slightly compressed. The purpose of maintaining the foam member 35 slightly compressed is to ensure that a uniform seal is obtained between the uper surface of the member 35 and the header 33 and between the lower surface of the member 35 and the header track 34.

It should be noted that the sill track 32 is provided with a barbed retaining flange 37 which cooperates with a slot 38 in the sill 31 to maintain the sill track 32 in proper relation to the sill 31. The use of the barbed flange 37 represents a significant improvement in a sill track and for the first time a sill track is provided which maintains its intimate seal with the sill during use of the window.

FIGURE 3 is a section of a sill track 32 showing in detail the structure thereof. The sill track includes slots 39, 40, 41 and 42 for sliding panes, each of which slots has a bottom surface 43 formed with curved ridges which prevent sticking of the pane to the slot during use. It will also be noted that the sill track 32 is so shaped as to conform to the slope of the sill 31 in FIGURE 2 yet have the surfaces 43 in a horizontal plane. FIGURE 3 also clearly illustrates the barbed flange 37 which holds the inner edge of the sill track 32 intimately fixed to the sill 31. Not shown in FIGURE 3 are holes spaced longitudinally of each of the slots 39, 40, 41 and 42 through which moisture accumulating on the window panes may escape beneath the sill track. The sill track is further provided with an opening in the bottom of the outer face 44 which permits any moisture accumulated beneath the sill track to drain by gravity away from the window.

FIGURE 4 is a section of the side rail 26 clearly showing the flange 30 which is adapted to cooperate with the locking member 29 in FIGURE 1 to lock the sliding panes in closed position. The member 26 is shown as having a tongue 45 which is illustrated as being hollow, since this greatly simplifies the extrusion and reduces the cost of the finished part. This tongue 45 is adapted to fit within the side track 28 mounted in the jambs of a finished window, to seal the window. The member 26 is also provided with internal serrations 46 which may bear directly on the glass of the pane, or preferably, on a filler tape which is wrapped round the edge of the pane before the member 26 is assembled to the pane.

FIGURE 5 illustrates the meeting rail which is fitted on the end of each sliding pane opposite to the end with the member 26. This meeting rail is similarly provided with serrations 47 for gripping the glass of the pane or for gripping a tape which is applied over the glass before the glass is entered into the member 27. The member 27 is also provided with an arm 48 which is adapted to engage a like arm of a corresponding meeting rail to seal the joint between the two panes of a window when the window is closed. To assist in this sealing action an undercut channel 49 is provided in which a weather stripping 50, which is shown in FIGURE 7, may be inserted to further assist in improving the seal between the adjacent meeting rails.

FIGURE 6 illustrates a pair of meeting rails in position with the window closed and it may clearly be seen that there is an overlap between the arms 48 of the respective meeting rails 27 and that these arms 48 are in contact with the weather strip situated in the undercut channels 49.

FIGURE 8 illustrates the side track 28 which is fitted within the jambs 20 and 21 of FIGURE 1. This side track 28 is similarly provided with undercut channels 51 and 52 in which a weather strip member 50 such as shown in FIGURE 7 may be fitted to form a seal between the protrusion 45 of the member 26 shown in FIGURE 4 and the member 28 when the window unit is closed and locked.

Figure 9:
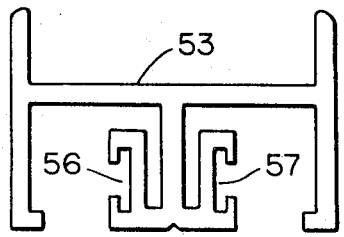
Figure 10:
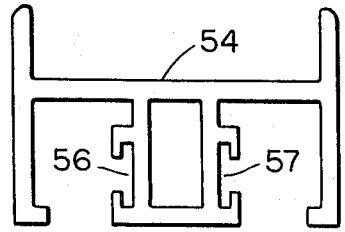
Figure 11:
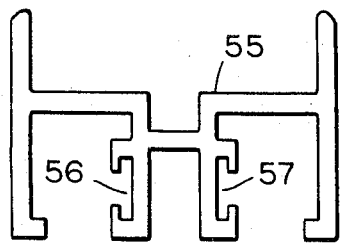
Figure 12:
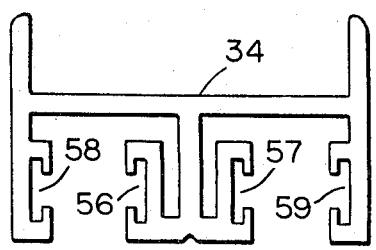

FIGURES 9, 10, 11 and 12 illustrate alternative forms of header track which is shown as numeral 34 in FIGURE 2. FIGURE 12 illustrates the form of header track actually used in the preferred form of the invention shown in FIGURE 2 and alternative header tracks 53, 54 and 55 are shown in FIGURES 9, 10 and 11 respectively. In FIGURES 9, 10 and 11 only one pair of undercut channels 56 and 57 are provided. The only principal difference between the various embodiments illustrated in FIGURES 9, 10 and 11 is in the manner in which the central portion of the extrusion is shaped to facilitate various extrusion methods. The header track shown in FIGURES 9, 10 and 11 as mentioned above is provided with only one pair of undercut channels 56 and 57 and accordingly only one sealing strip 50 per pane of glass is provided. The preferred form of header track 34 of the invention, shown in FIGURE 12 is provided with one pair of undercut channels for each pane of glass in the sliding window, that is in addition to the channels 56 and 57, channels 58 and 59 are also provided to improve the seal between the panes of the window and the header track.

FIGURES 13 to 17 inclusive illustrate the structure of one form of a locking member 29 which forms a portion of the present invention. The locking member 29 is provided with a base 60 which has a pair of holes 61 and 62 provided therein through which fasteners may be driven into the jambs of a window to fasten the locking member 29 to the jamb. Alternatively the locking member 29 may be fixed to the jamb of a window by any other suitable means which permits the locking member to cooperate with the flange 30 of a side rail 26 as per FIGURE 1. The member 29 is also provided with a spring member 63, which when the member 29 is assembled to a jamb is compressed and which assists in urging the portion of the member 29 remote from the spring 63 into engagement with the flange 30 of a side rail 26. The member 29 is provided with a handle 64 which includes a hook portion 65 which cooperates with the flange 30 for locking the window. The locking member 29 may also be provided with an abutment 66 to prevent the member from being forced to an excessive extent in the direction of the pane thereby preventing interference of the member 29 with a partially opened pane in the sliding window.

The member 29 preferably is a single piece moulding with all portions thereof being integral for simplicity and speed of manufacture.

FIGURES 18 and 19 illustrate an embodiment of locking member which is formed in two parts, 70 and 71. The part 71, which includes the hook portion 65 is snapped into the base portion 70 to form the completed locking member. As may be seen in the section of FIGURE 19, the base portion 17 is provided with a thinned portion 72 which allows the base portion to be flexed to separate the upstanding journal members 73 and 74 so that the bosses 75 of the portion 71 may be inserted in the slots 76. The portion 77 of the member 71 will rest against the surface of the member 70 and provides a resilient means urging the hook 65 into engaging relation with the flange 30 of a side rail 26 as previously illustrated in FIGURE 1.

The structure illustrated in FIGURES 18 and 19 offers certain advantages in the construction of dies for manufacturing the locking member which in certain circumstances will reduce the cost of production.

FIGURES 20, 21 and 22 illustrate yet another form of locking member 29 which may be constructed pursuant to the present invention. An inspection of FIGURES 20, 21 and 22 will clearly show the significant differences between this form of locking member 29 and the form of locking member illustrated in FIGURES 13 to 17 inclusive. In particular FIGURE 22 shows the shape of the locking member when it is moulded and FIGURE 21 shows the shape of the member when fastened to a window. It will be noticed that the base 60 is now formed in two separated segments 77 and 78 which when the part is moulded as shown in FIGURE 22, are positioned at right angles to the positions in which they are installed as shown in FIGURE 21. Once again the principal advantage here is in the simplicity of manufacturing the locking member and possible savings in cost may be effected by producing the locking member 29 in the form shown in FIGURES 20, 21 and 22.

FIGURE 23 shows an alternative form of side rail 26 which is used when the channel 28 is omitted from the window structure. In this case the member 26 is provided with a projecting part 80 to the outer end of which are connected resilient curved flanges 81. Flanges 81 are so designed in relation to the width of the slot 82 in which the projection portion 80 rests when the window is closed, that flanges 81 are compressed and form a seal between the flanges 81 and the sides 83 of the slots 82.

FIGURE 24 illustrates an alternative form of meeting rail in which the weather strip 50, shown in FIGURES 6 and 7, has been replaced with a resilient flange 84. The meeting rail 27 of FIGURE 24, may be used directly to replace the meeting rail shown in FIGURES 5 and 6 and is equivalent thereto. The meeting rail 27 shown in FIGURE 25 differs from the embodiment of FIGURE 24 in that the flange 85 is connected to the member 27 at the inner end of the member 48 and consequently would not operate as efficiently as the flange 84 of FIGURE 24. It is included herein, however, as it is a commercially possible form of meeting rail which may readily be formed by extrusion.

FIGURE 26 illustrates a side rail 26 of alternative form to that shown in FIGURES 4 and 23. In particular the side rail 26 of FIGURE 26 is provided with a slotted end 86 replacing the hollow tongue 45 of FIGURE 4. The slotted end 86 is provided with an undercut slot 87 in which a weather-strip 50 as shown in FIGURE 7, may be seated for sealing engagement with a flange member 88. It will be noted that the member 26 is provided with an obliquely angled face 89 to faciiltate engagement with the flange mmeber 88 as shown in FIGURE 27. The slanted surface 89 is also provided with a ridge 90 which bears against the flange member 88 to ensure a tight seal at the jamb of the window. The member 88 is also provided with a barbed foot 91 which engages a slot formed in the jamb 21 and is held in place thereby.

FIGURE 28 is a vertical cross section of a double-hung window which may be constructed using the extruded mouldings of the present invention and using a novel form of sill track 92 to replace the sill track 32 of FIGURE 2. It will also be appreciated that the header tracks 34 of FIGURE 2 could be used as side jamb rails in a double-hung window. As will be seen from the drawings each of the lower panes 93 and 94 is fitted with meeting rails 27 as shown in FIGURES 5 and 6 and the lower parts of the upper panes 95 and 96 are similarly provided with meeting rails 27. The upper parts of the panes 95 and 96 are provided with side rail members 26 as shown in FIGURE 4 which engage with tracks 28 positioned in slots in the header 97. The lower parts of the panes 93 and 94 are fitted with side rail members as illustrated in FIGURES 26 and 27. It will be appreciated that the sill 92 is provided with a pair of upstanding flanges 88.

From the foregoing detailed disclosure it will be clearly apparent that numerous changes may be made in the materials and in the method of forming the various members and extrusions used in constructing windows in accordance with the invention and that when these parts are combined they may be used either for forming the horizontal sliding sashless windows or may be combined to form conventional double-hung windows. Accordingly the scope of the present invention is as defined by the following claims.

I claim:

1. A sliding window comprising, a header, a pair of jambs, and a sill, an extruded plastic sill track mounted on said sill, an extruded plastic header track mounted in said header and superposed above said sill track, a resilient foam member positioned between said header track and said header and adapted to form a seal therebetween, each of said tracks being provided with corresponding grooves wherein a pair of panes of glass may slide, each pane of glass being provided with an extruded plastic meeting rail and an extruded plastic side rail, each jamb being provided with an extruded plastic side track in which said side rail is adapted to be received, said meeting rails being adapted to overlap one another in the closed position of said panes, each meeting rail comprising, a pane receiving channel provided with internal ribs adapted to grip the edge of a pane, an undercut slot on one side of said pane receiving channel adapted to receive a weather strip and a projecting flange having a free edge parallel to the pane in said first channel and with an enlarged tip adapted to overly the flange of a like meeting rail and form a seal therewith, the flange of said like meeting rail being adapted to bear throughout a substantial portion of its length against a weather strip in said undercut slot.

2. A window according to claim 1 wherein said header track is provided with at least one weather-strip adapted to form a seal between each pane and said header track.

3. A window according to claim 1 wherein each meeting rail is provided with a weather strip adapted to cooperate with the corresponding meeting rail to form a weather-tight seal.

4. A window according to claim 1 wherein each side track is provided with at least one weather strip adapted to form a seal between a side rail and said side track.

5. A window according to claim 1 wherein each side rail is provided with a flange adapted to cooperate with locking means to lock said panes of said window in a closed position.

6. A window according to claim 1 wherein said sill track comprises an extruded plastic member having a plurality of slots for sliding panes, each of said slots having a bottom surface formed with curved ridges to prevent sticking of the pane to the slot during use, said sill track further being provided with a barbed retaining flange adapted to cooperate with the sill to retain said track in intimate engagement with said sill throughout its length, the bottoms of said slots lying in a horizontal plane when said sill track is assembled to said sill.

References Cited

UNITED STATES PATENTS

| | | | |
|---|---|---|---|
| 2,418,014 | 3/1947 | Daab | 49—488 X |
| 2,793,406 | 5/1957 | Focht | 49—413 X |
| 2,798,578 | 7/1957 | Toth | 49—485 X |
| 2,970,642 | 2/1961 | Parsons | 49—485 X |
| 3,012,293 | 12/1961 | Migneault et al. | 49—413 |
| 3,065,507 | 11/1962 | Cloutier et al. | 49—458 X |

FOREIGN PATENTS 631,113  11/1961  Canada.

OTHER REFERENCES

E-Z Glide Catalogue, p. 9, Engineered Products, Flint, Mich. Copyright 1963, Rec'd in Grp. 420 on Oct. 23, 1963 last 2 figures on p. 9, A.I.A. File No. 27A.

New Epco Track & Accessories, Catalogue p. 18B, 3rd figure on p. 18B marked #206, Engineered Products, Flint, Mich. 1963, received in Scientific Library, April 30, 1964.

DAVID J. WILLIAMOWSKY, *Primary Examiner.*